United States Patent
Nyuugaku

(10) Patent No.: US 11,634,439 B2
(45) Date of Patent: Apr. 25, 2023

(54) ORGANOSILICON COMPOUND HAVING CYCLIC SILAZANE STRUCTURE, COMPOSITION CONTAINING THE SAME, AND METHOD FOR PRODUCING THE SAME

(71) Applicant: Shin-Etsu Chemical Co., Ltd., Tokyo (JP)

(72) Inventor: Takeshi Nyuugaku, Joetsu (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 17/366,963

(22) Filed: Jul. 2, 2021

(65) Prior Publication Data

US 2022/0009949 A1    Jan. 13, 2022

(30) Foreign Application Priority Data

Jul. 10, 2020    (JP) .............. JP2020-119087

(51) Int. Cl.
*C07F 7/10*    (2006.01)
*C07F 7/08*    (2006.01)

(52) U.S. Cl.
CPC .............. *C07F 7/10* (2013.01); *C07F 7/0816* (2013.01)

(58) Field of Classification Search
CPC .................. C07F 7/10; C07F 7/0816
See application file for complete search history.

(56) References Cited

U.S. PATENT DOCUMENTS

| | | | |
|---|---|---|---|
| 4,952,619 A * | 8/1990 | Greco | C08F 8/42 524/99 |
| 2017/0362233 A1* | 12/2017 | Liu | C07D 471/08 |
| 2020/0172737 A1* | 6/2020 | Nyuugaku | C03C 17/30 |
| 2022/0033581 A1* | 2/2022 | Kawakami | C09D 171/02 |

FOREIGN PATENT DOCUMENTS

| | | | |
|---|---|---|---|
| CN | 103450201 A | * 12/2013 | |
| DE | 10140563 A1 | 2/2003 | |
| EP | 0 162 524 A2 | 11/1985 | |
| EP | 162524 A | * 11/1985 | ........... C07D 207/08 |
| JP | 2008-143582 A | 6/2008 | |
| JP | 2008143582 A | * 6/2008 | |
| WO | WO 03/091186 A2 | 11/2003 | |

OTHER PUBLICATIONS

European Search Opinion, EP 3936510 A1 (dated Dec. 2, 2021) (Year: 2021).*
Extended European Search Report for corresponding European Application No. 21182482.6, dated Dec. 2, 2021.

* cited by examiner

*Primary Examiner* — Alexander R Pagano
(74) *Attorney, Agent, or Firm* — Birch, Stewart, Kolasch & Birch, LLP

(57) ABSTRACT

To provide an organosilicon compound having a cyclic silazane structure, represented by the following general formula (1):

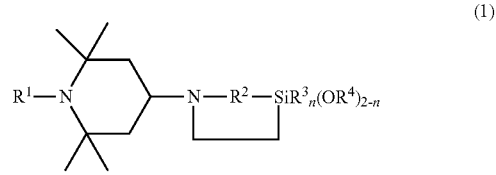

(1)

wherein $R^1$ represents a hydrogen atom, an oxy radical, a hydroxyl group, a substituted or unsubstituted alkoxy group having 1 to 10 carbon atoms, or a substituted or unsubstituted monovalent hydrocarbon group having 1 to 10 carbon atoms, $R^2$ represents a substituted or unsubstituted alkylene group having 3 to 6 carbon atoms, $R^3$ and R each independently represent a substituted or unsubstituted monovalent hydrocarbon group having 1 to 10 carbon atoms, and n represents an integer of 0 to 2.

7 Claims, 2 Drawing Sheets

ORGANOSILICON COMPOUND HAVING CYCLIC SILAZANE STRUCTURE, COMPOSITION CONTAINING THE SAME, AND METHOD FOR PRODUCING THE SAME

CROSS-REFERENCE TO RELATED APPLICATION

This non-provisional application claims priority under 35 U.S.C. § 119(a) on Patent Application No. 2020-119087 filed in Japan on Jul. 10, 2020, the entire contents of which are hereby incorporated by reference.

TECHNICAL FIELD

The present invention relates to an organosilicon compound having a cyclic silazane structure, a composition containing the same, and a method for producing the same.

BACKGROUND ART

An organosilicon compound having a hydrolyzable silyl group and an organic group, in which a silanol group generated by hydrolysis of the hydrolyzable silyl group forms a covalent bond with a hydroxyl group on the surface of an inorganic material, and further, the organic group reacts with an organic material, allows joining the organic material and the inorganic material, which are usually difficult to be joined. This joining enables the organic-inorganic composite material to have properties such as heat resistance, water resistance, weather resistance, improvement in mechanical strength, adhesion, dispersibility, hydrophobicity, and rust prevention.

Utilizing these properties, the organosilicon compound is used in a wide range of fields and applications such as a silane coupling agent, resin additive, surface treatment agent, fiber treatment agent, adhesive agent, paint additive, and polymer modifier.

Examples of the organosilicon compound include alkoxysilane compounds having an amino group, such as 3-(n-butylamino)propyltrimethoxysilane (Patent Document 1), and alkoxysilane compounds having a cyclic silazane structure, such as 2,2-dimethoxy-1-butyl-1-aza-2-silacyclopentane (Patent Document 2).

CITATION LIST

Patent Document 1: DE-C 10140563
Patent Document 2: WO 2003/091186

SUMMARY OF THE INVENTION

However, in an alkoxysilane compound having an amino group described in Patent Document 1, a considerable amount of alcohol is generated by hydrolysis of the alkoxysilyl group. In recent years, reduction of volatile organic compounds has been a major theme in environmental issues deeply related to global warming, health problems, and the like. The alkoxysilane compound generates a large amount of alcohol, which may be a burden on the environment.

In addition, in the alkoxysilane compound having an amino group, silanol groups produced by hydrolysis are condensed to produce siloxane, and thereby the reactivity with the hydroxyl group on a substrate surface may be reduced. In order to allow the alkoxysilane compound to sufficiently react with the hydroxyl group on the substrate surface, it is necessary to raise the reaction temperature or lengthen the reaction time, but these conditions reduce productivity. Moreover, if an unreacted silanol group is present, the silanol group and the amino group are mixedly present on the silane-treated substrate surface, and thereby, a desired effect due to the amino group may not sufficiently be exhibited.

In this regard, in an alkoxysilane compound having a cyclic silazane structure described in Patent Document 2, an amino group and an alkoxysilyl group in the alkoxysilane compound having the amino group are subjected to an intramolecular cyclization reaction to induce a cyclic silazane structure, so that the amount of alcohol generated can be reduced. In addition, because this cyclic silazane structure reacts with a hydroxyl group on a substrate surface to form a covalent bond without being hydrolyzed, it also has an advantage of having no problem of hydrolysis in the alkoxysilane compound having the amino group described above.

However, because the alkoxysilane compound having the cyclic silazane structure described in Patent Document 2 has a problem in weather resistance and transparency due to the substituent of the amino group, the silane-treated substrate surface is deteriorated by an external factor or internal factor under normal environmental conditions.

In other words, when the substituent of the amino group is a hydrocarbon group such as a methyl group, butyl group, or allyl group, bond energy of a carbon-hydrogen bond and a carbon-carbon bond of the hydrocarbon group is lower than ultraviolet energy, and these bonds are therefore decomposed (autoxidation) when exposed to sunlight or a radical. When the autoxidation proceeds, peeling, cracks, or the like occur on the substrate surface. In addition, when the substituent of the amino group is a hydrogen atom, aminoalkyl group, or the like, a primary amino group appears on the silane-treated substrate surface. This primary amino group reacts with carbon dioxide to form a carbonate (amine blushing). When the amine blushing occurs, the substrate surface is whitened and the appearance becomes poor.

Furthermore, in recent years, with diversification of intended use in a wide range of fields and applications of the above-described organosilicon compounds, properties such as anti-fouling and anti-fogging properties may be required on a silane-treated substrate surface. In order to achieve these properties, it is necessary to impart wettability or liquid repellency to a substrate surface, and there have been a case where the alkoxysilane compound having a cyclic silazane structure having the above-mentioned substituent has not been applicable.

As described above, it has been desired to develop an organosilicon compound having a cyclic silazane structure capable of imparting weather resistance and transparency and further imparting wettability or liquid repellency to the silane-treated substrate surface.

The present invention has been made in view of the above circumstances, and an object of the present invention is to provide an organosilicon compound having a cyclic silazane structure capable of imparting weather resistance and transparency and further imparting wettability or liquid repellency to the silane-treated substrate surface, a composition containing the same, and a method for producing the same.

As a result of intensive studies to achieve the above object, the present inventors have found that, by subjecting a substrate to a silane coupling treatment or a surface treatment using an alkoxysilane compound having a cyclic silazane structure in which a substituent of an amino group is a hindered amino group, weather resistance and transparency can be imparted, and wettability or liquid repellency can be further imparted to the silane-treated substrate surface, thus completing the present invention.

In other words, the present invention provides:

1. An organosilicon compound having a cyclic silazane structure, represented by the following general formula (1):

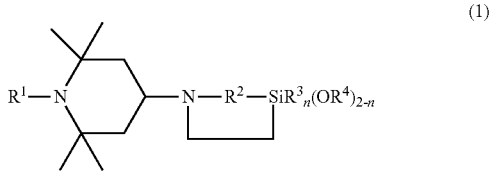

wherein $R^1$ represents a hydrogen atom, an oxy radical, a hydroxyl group, a substituted or unsubstituted alkoxy group having 1 to 10 carbon atoms, or a substituted or unsubstituted monovalent hydrocarbon group having 1 to 10 carbon atoms, $R^2$ represents a substituted or unsubstituted alkylene group having 3 to 6 carbon atoms, $R^3$ and $R^4$ each independently represent a substituted or unsubstituted monovalent hydrocarbon group having 1 to 10 carbon atoms, and n represents an integer of 0 to 2;

2. A composition containing the organosilicon compound having the cyclic silazane structure according to 1 and an organosilicon compound having an amino group and represented by the following general formula (2):

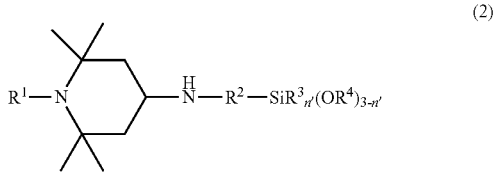

wherein $R^1$ represents a hydrogen atom, an oxy radical, a hydroxyl group, a substituted or unsubstituted alkoxy group having 1 to 10 carbon atoms, or a substituted or unsubstituted monovalent hydrocarbon group having 1 to 10 carbon atoms, $R^2$ represents a substituted or unsubstituted alkylene group having 3 to 6 carbon atoms, $R^3$ and $R^4$ each independently represent a substituted or unsubstituted monovalent hydrocarbon group having 1 to 10 carbon atoms, and n' represents an integer of 0 to 2, the composition having a content of the organosilicon compound having the amino group and represented by general formula (2) is 30 wt % or less;

3. A method for producing the organosilicon compound having the cyclic silazane structure according to 1, the method including distillation of an organosilicon compound having an amino group and represented by general formula (2) in the presence of a catalyst while generated alcohol is distilled off, general formula (2) being as follows:

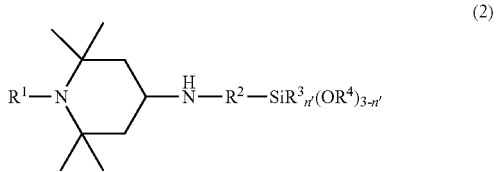

wherein $R^1$ represents a hydrogen atom, an oxy radical, a hydroxyl group, a substituted or unsubstituted alkoxy group having 1 to 10 carbon atoms, or a substituted or unsubstituted monovalent hydrocarbon group having 1 to 10 carbon atoms, $R^2$ represents a substituted or unsubstituted alkylene group having 3 to 6 carbon atoms, $R^3$ and $R^4$ each independently represent a substituted or unsubstituted monovalent hydrocarbon group having 1 to 10 carbon atoms, and n' represents an integer of 0 to 2;

4. A method for producing the organosilicon compound having the cyclic silazane structure according to 3, wherein the distillation is performed at a temperature of 100 to 300° C. and a pressure of 0.01 to 10.0 kPa;

5. A method for producing the organosilicon compound having the cyclic silazane structure according to 3 or 4, wherein the catalyst is a basic compound or an acidic compound;

6. A method for producing the organosilicon compound having the cyclic silazane structure according to 5, wherein the basic compound is an alkali metal alkoxide compound; and 7. A method for producing the organosilicon compound having the cyclic silazane structure according to 5, wherein the acidic compound is a sulfonic acid compound or a carboxylic acid compound.

Advantageous Effects of the Invention

According to the organosilicon compound having the cyclic silazane structure of the present invention, by subjecting a substrate to a silane coupling treatment or a surface treatment using the organosilicon compound, weather resistance and transparency can be imparted, and wettability or liquid repellency can be further imparted to the silane-treated substrate surface.

DESCRIPTION OF THE PREFERRED EMBODIMENT

Figure 1:
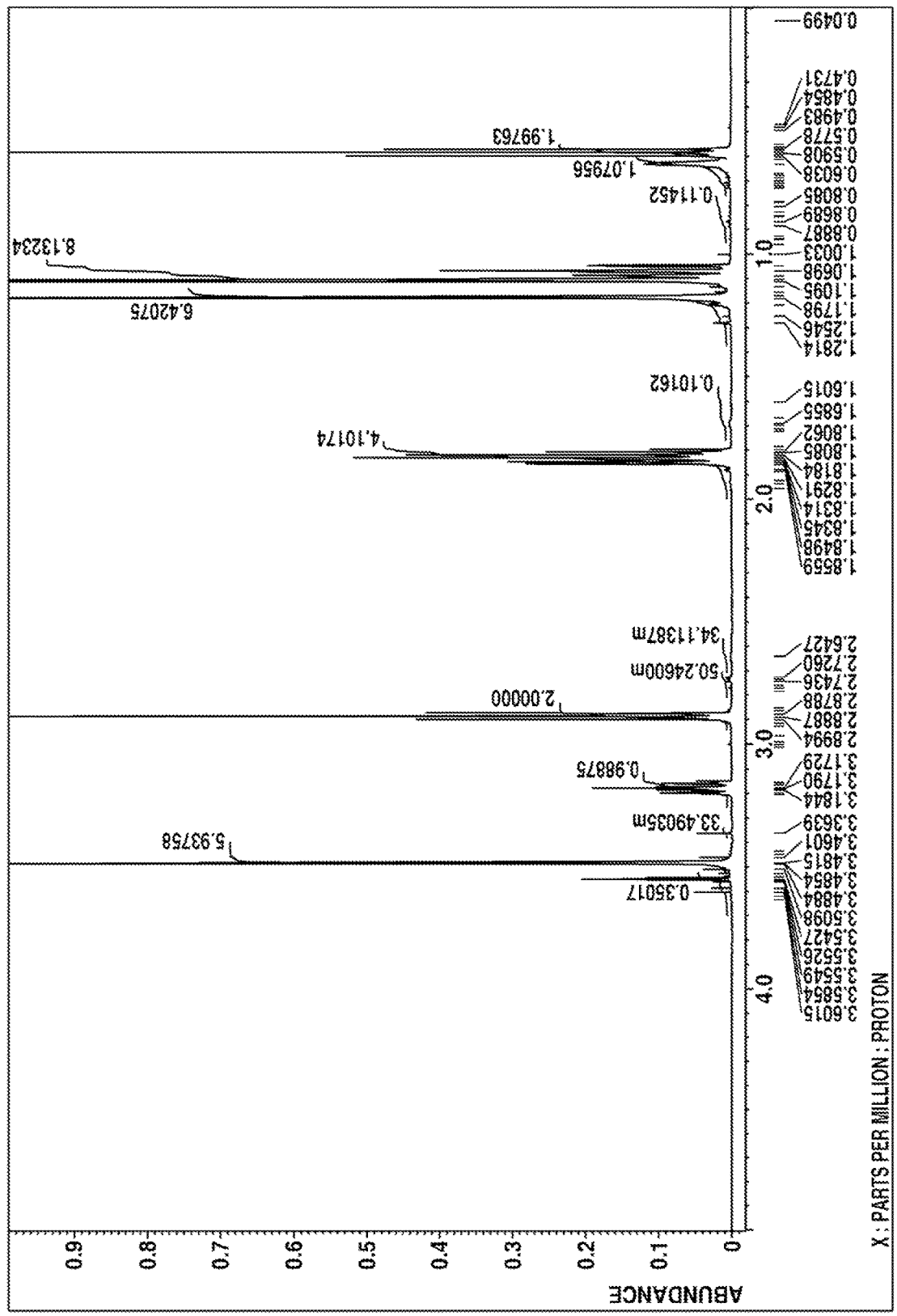
FIG. 1 is a ¹H-NMR spectrum of a compound obtained in Example 1.

Hereinafter, the present invention is specifically described.

The organosilicon compound having the cyclic silazane structure of the present invention is represented by the following general formula (1) (hereinafter, the organosilicon compound represented by general formula (1) is referred to as an "organosilicon compound (1)").

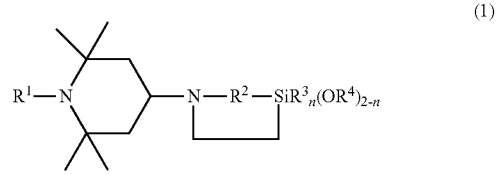

In formula (1), $R^1$ represents a hydrogen atom, an oxy radical, a hydroxyl group, a substituted or unsubstituted alkoxy group having 1 to 10 carbon atoms, or a substituted or unsubstituted monovalent hydrocarbon group having 1 to 10 carbon atoms.

The alkoxy group may be linear, branched, or cyclic, and specific examples thereof include linear alkoxy groups such as methoxy, ethoxy, n-propoxy, n-butoxy, n-pentyloxy, n-hexyloxy, n-heptyloxy, n-octyloxy, n-nonyloxy, and n-decyloxy groups; branched alkoxy groups such as sec-propoxy, sec-butoxy, tert-butoxy, sec-pentyloxy, tert-pentyloxy, sec-hexyloxy, tert-hexyloxy, sec-heptyloxy, tert-heptyloxy, sec-octyloxy, tert-octyloxy, sec-nonyloxy, tert-nonyloxy, sec-decyloxy, and tert-decyloxy groups; cyclic alkoxy groups such as cyclopentyloxy and cyclohexyloxy groups; alkenyloxy groups such as vinyloxy, allyloxy, butenyloxy, and methallyloxy groups; aryloxy groups such as phenyloxy, tolyloxy, and xylyloxy groups; and aralkyloxy groups such as benzyloxy and phenethyloxy groups.

The monovalent hydrocarbon group may be linear, branched, or cyclic, and specific examples thereof include linear alkyl groups such as methyl, ethyl, n-propyl, n-butyl, n-pentyl, n-hexyl, n-heptyl, n-octyl, n-nonyl, and n-decyl groups; branched alkyl groups such as sec-propyl, sec-butyl, tert-butyl, sec-pentyl, tert-pentyl, sec-hexyl, tert-hexyl, sec-heptyl, tert-heptyl, sec-octyl, tert-octyl, sec-nonyl, tert-nonyl, sec-decyl, and tert-decyl groups; cyclic alkyl groups such as cyclopentyl and cyclohexyl groups; alkenyl groups such as vinyl, allyl, butenyl, and methallyl groups; aryl groups such as phenyl, tolyl, and xylyl groups; and aralkyl groups such as benzyl and phenethyl groups.

Some or all of hydrogen atoms of the above alkoxy groups and monovalent hydrocarbon groups may be substituted with other substituents, and specific examples of such substituents include alkoxy groups having 1 to 3 carbon atoms, such as methoxy, ethoxy, and (iso) propoxy groups; halogen atoms such as fluorine, chlorine, and bromine; aromatic hydrocarbon (aryl) groups such as a phenyl group; a cyano group; an amino group; an ester group; an ether group; a carbonyl group; an acyl group; and a sulfide group. The above substituents can be used alone or in combination of two or more. Substitution positions for the above substituents are not particularly limited, and the number of substituents is also not limited.

Among the above examples, $R^1$ is preferably a hydrogen atom; an oxy radical; a substituted or unsubstituted linear, branched, or cyclic alkoxy group having 1 to 6 carbon atoms; an alkenyloxy group; an aryloxy group; an aralkyloxy group; a substituted or unsubstituted linear, branched, or cyclic alkyl group having 1 to 6 carbon atoms; an alkenyl group; an aryl group; or an aralkyl group. In particular, from the viewpoint of easy availability of a precursor raw material, $R^1$ is more preferably a hydrogen atom, an oxy radical, an unsubstituted linear alkoxy group having 1 to 3 carbon atoms, an alkenyloxy group, an unsubstituted linear alkyl group having 1 to 3 carbon atoms, or an alkenyl group, and is still more preferably a hydrogen atom, oxy radical, methoxy group, ethoxy group, methyl group, or ethyl group.

$R^2$ in formula (1) represents a substituted or unsubstituted alkylene group having 3 to 6 carbon atoms, preferably 3 to 5 carbon atoms, more preferably 3 or 4 carbon atoms.

The alkylene group having 3 to 6 carbon atoms may be linear, branched, or cyclic, and specific examples thereof include trimethylene, propylene, tetramethylene, isobutylene, and cyclohexylene groups.

Some or all of hydrogen atoms of these alkylene groups may be substituted with other substituents, and examples of such substituents include the same substituents as the other substituents exemplified for $R^1$.

In addition, in the above alkylene groups, one of or two or more of an ether group, ester group, carbonyl group, sulfide group, disulfide group, and the like may be interposed in the molecular chain.

Among the above examples, as $R^2$, an unsubstituted linear alkylene group having 3 or 4 carbon atoms is preferable, and a trimethylene group is more preferable particularly from the viewpoint of easy availability of a precursor raw material.

$R^3$ and $R^4$ in formula (1) each independently represent a substituted or unsubstituted monovalent hydrocarbon group having 1 to 10 carbon atoms, preferably 1 to 8 carbon atoms, and more preferably 1 to 6 carbon atoms.

Examples of the monovalent hydrocarbon group having 1 to 10 carbon atoms include the same monovalent hydrocarbon groups as exemplified for $R^1$ mentioned above.

Among the above examples, as $R^3$ and $R^4$, an unsubstituted linear alkyl group having 1 to 6 carbon atoms is preferable, and particularly from the viewpoint of easy availability of a precursor raw material, an unsubstituted linear alkyl group having 1 to 3 carbon atoms is preferable, and methyl and ethyl groups are more preferable.

The n in formula (1) is an integer of 0 to 2, and particularly when the organosilicon compound (1) is used as a silane coupling agent, a surface treatment agent, or the like, the n is preferably 0 or 1 from the viewpoint of reacting of the organosilicon compound (1) with a plurality of hydroxyl groups on the substrate surface to enhance the adhesion.

Specific examples of the organosilicon compound (1) include
2,2-dimethoxy-1-(2,2,6,6-tetramethyl-4-piperidinyl)-1-aza-2-silacyclopentane,
2-methoxy-2-methyl-1-(2,2,6,6-tetramethyl-4-piperidinyl)-1-aza-2-silacyclopentane,
2,2-diethoxy-1-(2,2,6,6-tetramethyl-4-piperidinyl)-1-aza-2-silacyclopentane,
2-ethoxy-2-methyl-1-(2,2,6,6-tetramethyl-4-piperidinyl)-1-aza-2-silacyclopentane,
2,2-dimethoxy-1-(1-oxyl-2,2,6,6-tetramethyl-4-piperidinyl)-1-aza-2-silacyclopentane,
2-methoxy-2-methyl-1-(1-oxyl-2,2,6,6-tetramethyl-4-piperidinyl)-1-aza-2-silacyclopentane,
2,2-diethoxy-1-(1-oxyl-2,2,6,6-tetramethyl-4-piperidinyl)-1-aza-2-silacyclopentane.
2-ethoxy-2-methyl-1-(1-oxyl-2,2,6,6-tetramethyl-4-piperidinyl)-1-aza-2-silacyclopentane,
2,2-dimethoxy-1-(1-methoxy-2,2,6,6-tetramethyl-4-piperidinyl)-1-aza-2-silacyclopentane,
2-methoxy-2-methyl-1-(1-methoxy-2,2,6,6-tetramethyl-4-piperidinyl)-1-aza-2-silacyclopentane,
2,2-diethoxy-1-(1-methoxy-2,2,6,6-tetramethyl-4-piperidinyl)-1-aza-2-silacyclopentane,
2-ethoxy-2-methyl-1-(1-methoxy-2,2,6,6-tetramethyl-4-piperidinyl)-1-aza-2-silacyclopentane,
2,2-dimethoxy-1-(1-ethoxy-2,2,6,6-tetramethyl-4-piperidinyl)-1-aza-2-silacyclopentane,
2-methoxy-2-methyl-1-(1-ethoxy-2,2,6,6-tetramethyl-4-piperidinyl)-1-aza-2-silacyclopentane,
2,2-diethoxy-1-(1-ethoxy-2,2,6,6-tetramethyl-4-piperidinyl)-1-aza-2-silacyclopentane,
2-ethoxy-2-methyl-1-(1-ethoxy-2,2,6,6-tetramethyl-4-piperidinyl)-1-aza-2-silacyclopentane,
2,2-dimethoxy-1-(1,2,2,6,6-pentamethyl-4-piperidinyl)-1-aza-2-silacyclopentane,
2-methoxy-2-methyl-1-(1,2,2,6,6-pentamethyl-4-piperidinyl)-1-aza-2-silacyclopentane, 2,2-diethoxy-1-(1,2,2,6,6-pentamethyl-4-piperidinyl)-1-aza-2-silacyclopentane,
2-ethoxy-2-methyl-1-(1,2,2,6,6-pentamethyl-4-piperidinyl)-1-aza-2-silacyclopentane,
2,2-dimethoxy-1-(1-ethyl-2,2,6,6-pentamethyl-4-piperidinyl)-1-aza-2-silacyclopentane,
2-methoxy-2-methyl-1-(1-ethyl-2,2,6,6-pentamethyl-4-piperidinyl)-1-aza-2-silacyclopentane,
2,2-diethoxy-1-(1-ethyl-2,2,6,6-pentamethyl-4-piperidinyl)-1-aza-2-silacyclopentane, and
2-ethoxy-2-methyl-1-(1-ethyl-2,2,6,6-pentamethyl-4-piperidinyl)-1-aza-2-silacyclopentane.

Among the above examples, the organosilicon compound (1) is preferably, particularly when used as a silane coupling agent, a surface treatment agent, or the like, from the viewpoint of reacting with a plurality of hydroxyl groups on the substrate surface to enhance the adhesion, 2,2-dimethoxy-1-(2,2,6,6-tetramethyl-4-piperidinyl)-1-aza-2-silacyclopentane,
2,2-diethoxy-1-(2,2,6,6-tetramethyl-4-piperidinyl)-1-aza-2-silacyclopentane.
2,2-dimethoxy-1-(1-oxyl-2,2,6,6-tetramethyl-4-piperidinyl)-1-aza-2-silacyclopentane,
2,2-diethoxy-1-(1-oxyl-2,2,6,6-tetramethyl-4-piperidinyl)-1-aza-2-silacyclopentane,
2,2-dimethoxy-1-(1-methoxy-2,2,6,6-tetramethyl-4-piperidinyl)-1-aza-2-silacyclopentane,
2,2-diethoxy-1-(1-methoxy-2,2,6,6-tetramethyl-4-piperidinyl)-1-aza-2-silacyclopentane,
2,2-dimethoxy-1-(1-ethoxy-2,2,6,6-tetramethyl-4-piperidinyl)-1-aza-2-silacyclopentane,
2,2-diethoxy-1-(1-ethoxy-2,2,6,6-tetramethyl-4-piperidinyl)-1-aza-2-silacyclopentane,
2,2-dimethoxy-1-(1,2,2,6,6-pentamethyl-4-piperidinyl)-1-aza-2-silacyclopentane,
2,2-diethoxy-1-(1,2,2,6,6-pentamethyl-4-piperidinyl)-1-aza-2-silacyclopentane,
2,2-dimethoxy-1-(1-ethyl-2,2,6,6-pentamethyl-4-piperidinyl)-1-aza-2-silacyclopentane, and
2,2-diethoxy-1-(1-ethyl-2,2,6,6-pentamethyl-4-piperidinyl)-1-aza-2-silacyclopentane.

Next, a method for producing the organosilicon compound (1) of the present invention is described.

In the present invention, the organosilicon compound (1) is produced by distilling an organosilicon compound having an amino group and represented by the following general formula (2) (hereinafter, referred to as an organosilicon compound (2)) in the presence of a catalyst while distilling off generated alcohol.

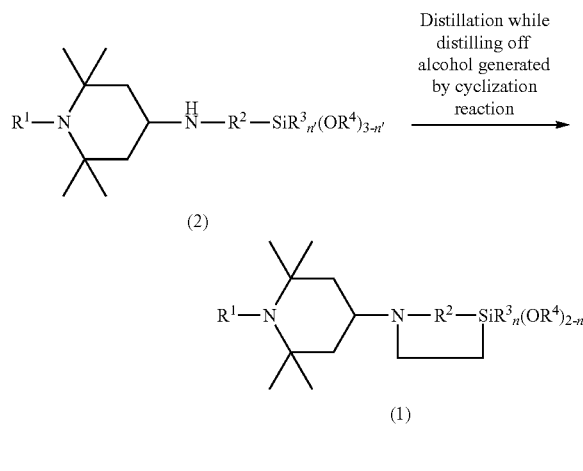

(In the formula, $R^1$, $R^2$, $R^3$, $R^4$, and n have the same meaning as mentioned above.)

In general formula (2), n' is an integer of 0 to 2, but when the organosilicon compound (1) to be obtained is used as a silane coupling agent, a surface treatment agent, or the like, n' is preferably 0 or 1 from the viewpoint of reacting of the organosilicon compound (1) with a plurality of hydroxyl groups on the substrate surface to enhance the adhesion.

Specific examples of the organosilicon compound (2) include
N-[3-(trimethoxysilyl)propyl]-2,2,6,6-tetramethyl-4-aminopiperidine,
N-[3-(dimethoxymethylsilyl)propyl]-2,2,6,6-tetramethyl-4-aminopiperidine,
N-[3-(triethoxysilyl)propyl]-2,2,6,6-tetramethyl-4-aminopiperidine,
N-[3-(diethoxymethylsilyl)propyl]-2,2,6,6-tetramethyl-4-aminopiperidine,
N-[3-(trimethoxysilyl)propyl]-1-oxyl-2,2,6,6-tetramethyl-4-aminopiperidine,
N-[3-(dimethoxymethylsilyl)propyl]-1-oxyl-2,2,6,6-tetramethyl-4-aminopiperidine,
N-[3-(triethoxysilyl)propyl]-1-oxyl-2,2,6,6-tetramethyl-4-aminopiperidine.
N-[3-(diethoxymethylsilyl)propyl]-1-oxyl-2,2,6,6-tetramethyl-4-aminopiperidine,
N-[3-(trimethoxysilyl)propyl]-1-methoxy-2,2,6,6-tetramethyl-4-aminopiperidine.
N-[3-(dimethoxymethylsilyl)propyl]-1-methoxy-2,2,6,6-tetramethyl-4-aminopiperidine,
N-[3-(triethoxysilyl)propyl]-1-methoxy-2,2,6,6-tetramethyl-4-aminopiperidine,
N-[3-(diethoxymethylsilyl)propyl]-1-methoxy-2,2,6,6-tetramethyl-4-aminopiperidine,
N-[3-(trimethoxysilyl)propyl]-1-ethoxy-2,2,6,6-tetramethyl-4-aminopiperidine.
N-[3-(dimethoxymethylsilyl)propyl]-1-ethoxy-2,2,6,6-tetramethyl-4-aminopiperidine,
N-[3-(triethoxysilyl)propyl]-1-ethoxy-2,2,6,6-tetramethyl-4-aminopiperidine,
N-[3-(diethoxymethylsilyl)propyl]-1-ethoxy-2,2,6,6-tetramethyl-4-aminopiperidine,
N-[3-(trimethoxysilyl)propyl]-1,2,2,6,6-pentamethyl-4-aminopiperidine,
N-[3-(dimethoxymethylsilyl)propyl]-1,2,2,6,6-pentamethyl-4-aminopiperidine,
N-[3-(triethoxymethylsilyl)propyl]-1,2,2,6,6-pentamethyl-4-aminopiperidine,
N-[3-(diethoxymethylsilyl)propyl]-1,2,2,6,6-pentamethyl-4-aminopiperidine,
N-[3-(trimethoxysilyl)propyl]-1-ethyl-2,2,6,6-pentamethyl-4-aminopiperidine,
N-[3-(dimethoxymethylsilyl)propyl]-1-ethyl-2,2,6,6-pentamethyl-4-aminopiperidine,
N-[3-(triethoxysilyl)propyl]-1-ethyl-2,2,6,6-pentamethyl-4-aminopiperidine, and
N-[3-(diethoxymethylsilyl)propyl]-1-ethyl-2,2,6,6-pentamethyl-4-aminopiperidine.

Among the above examples, particularly from the viewpoint of easy availability of a precursor raw material, the organosilicon compound (2) is preferably
N-[3-(trimethoxysilyl)propyl]-2,2,6,6-tetramethyl-4-aminopiperidine,
N-[3-(triethoxysilyl)propyl]-2,2,6,6-tetramethyl-4-aminopiperidine,
N-[3-(trimethoxysilyl)propyl]-1-oxyl-2,2,6,6-tetramethyl-4-aminopiperidine, N-[3-(triethoxysilyl)propyl]-1-oxyl-2,2,6,6-tetramethyl-4-aminopiperidine.
N-[3-(trimethoxysilyl)propyl]-1-methoxy-2,2,6,6-tetramethyl-4-aminopiperidine,
N-[3-(triethoxysilyl)propyl]-1-methoxy-2,2,6,6-tetramethyl-4-aminopiperidine,
N-[3-(trimethoxysilyl)propyl]-1-ethoxy-2,2,6,6-tetramethyl-4-aminopiperidine,
N-[3-(triethoxysilyl)propyl]1-ethoxy-2,2,6,6-tetramethyl-4-aminopiperidine,
N-[3-(trimethoxysilyl)propyl]-1,2,2,66-pentamethyl-4-aminopiperidine,
N-[3-(triethoxysilyl)propyl]-1,2,2,6,6-pentamethyl-4-aminopiperidine,
N-[3-(trimethoxysilyl)propyl]-1-ethyl-2,2,6,6-pentamethyl-4-aminopiperidine, and
N-[3-(triethoxysilyl)propyl]-1-ethyl-2,2,6,6-pentamethyl-4-aminopiperidine.

The conditions for distilling off generated alcohol are not particularly limited as long as they are conditions under which the alcohol is vaporized.

The temperature for distillation is preferably in the range of 100 to 300° C., more preferably 100 to 280° C., and still more preferably 100 to 260° C. from the viewpoint of productivity. Note that, when distillation is performed using a distillation column, the temperature for distillation refers to the temperature of the upper part of the distillation column.

The distillation time is preferably in the range of 1 to 50 hours, more preferably 1 to 40 hours, and still more preferably 1 to 30 hours from the viewpoint of productivity.

The distillation pressure is preferably in the range of 0.01 to 10.0 kPa, more preferably 0.01 to 9.0 kPa, and still more preferably 0.01 to 8.0 kPa from the viewpoint of productivity.

The catalyst used in the production method of the present invention can be appropriately selected from basic compounds or acidic compounds.

Specific examples of the basic compounds include alkali metal hydroxide compounds such as potassium hydroxide, sodium hydroxide, and cesium hydroxide; alkali metal alkoxide compounds such as potassium methoxide, sodium methoxide, potassium ethoxide, and sodium ethoxide; quaternary ammonium hydroxide compounds having an alkyl group, an aryl group, and/or the like, such as tetramethylammonium hydroxide, tetraethylammonium hydroxide, tetrapropylammonium hydroxide, tetrabutylammonium hydroxide, and trimethylbenzylammonium hydroxide.

Among the above examples, an alkali metal alkoxide compound is preferred particularly from the viewpoints of easy availability and reactivity.

Note that the above basic compounds can be used in an aqueous solution, an alcohol solution, or the like.

Specific examples of the acidic compounds include sulfonic acid compounds such as methanesulfonic acid, paratoluenesulfonic acid, trifluoromethanesulfonic acid, and dodecylbenzenesulfonic acid; carboxylic acid compounds such as acetic acid and propionic acid; sulfuric acid; and phosphoric acid.

Among the above examples, a sulfonic acid compound and a carboxylic acid compound are preferable particularly from the viewpoints of easy availability and reactivity.

Note that the above acidic compounds can be used in an aqueous solution, an alcohol solution, or the like.

The amount of the catalyst used is not particularly limited as long as it is the amount in which catalytic effect of the cyclization reaction is exhibited, but from the viewpoint of reactivity or productivity, the amount of the catalyst as the basic compound or the acidic compound is preferably in the range of 0.001 to 10.0 mol, more preferably 0.001 to 5.0 mol, and still more preferably 0.01 to 2.0 mol per 1 mol of the organosilicon compound (2).

The above-mentioned cyclization reaction proceeds without a solvent, but a solvent can also be used. Examples of the solvent include solvents based on hydrocarbons such as pentane, hexane, cyclohexane, heptane, isooctane, benzene, toluene, and xylene; solvents based on ketones such as acetone and methyl isobutyl ketone; solvents based on ethers such as diethyl ether, tetrahydrofuran, and dioxane; solvents based on esters such as ethyl acetate and butyl acetate; aprotic polar solvents such as acetonitrile, N,N-dimethylformamide; solvents based on chlorinated hydrocarbons such as dichloromethane and chloroform, and these solvents may be used alone or in combination of two or more.

Among the above examples, hydrocarbon-based, ether-based, ester-based, and aprotic polar solvents are particularly preferable from the viewpoint of compatibility with the organosilicon compound (2).

In addition, an acid or a base may be used as a pH adjusting agent.

By treating a substrate using a silane coupling agent or a surface treatment agent (hereinafter, referred to as a "treatment agent") containing the organosilicon compound (1) of the present invention, the amount of alcohol generated during the treatment can be reduced, and moreover, not only weather resistance and transparency but also wettability or liquid repellency can be imparted to the treated substrate surface.

In addition, a composition containing the organosilicon compound (1) and the organosilicon compound (2) can also be used as the treatment agent, and in this case, the amount of alcohol generated can be reduced as compared with the case of using the organosilicon compound (2) alone.

When the organosilicon compound (2) is used for the composition, the content of the organosilicon compound (2) is preferably 30 wt % or less, more preferably 20 wt % or less, still more preferably 10 wt % or less, and furthermore preferably 5 wt % or less in the composition from the viewpoint of reducing the amount of alcohol generated.

When the silane coupling treatment or the surface treatment of a substrate is performed using the treatment agent containing the organosilicon compound (1) of the present invention, there is no problem in using the treatment agent as it is, but the treatment agent may be diluted with a solvent and used.

As the solvent for the above case, specifically, the same solvents as the exemplified solvents for use in the cyclization reaction can be used.

The concentration of the treatment agent is not particularly limited, but from the viewpoint of reactivity or productivity, it is preferable to dilute and use the organosilicon compound (1) in the solvent so that the concentration of the organosilicon compound (1) is preferably in the range of 0.01 to 50 wt %, preferably 0.1 to 20 wt %, and still more preferably 0.1 to 10 wt %.

Next, a method for the silane coupling treatment or the surface treatment of a substrate using the treatment agent containing the organosilicon compound (1) of the present invention is described.

The method for performing the silane coupling treatment or the surface treatment of a substrate using the treatment agent containing the organosilicon compound (1) is not particularly limited, and examples thereof include a method in which the treatment agent is applied to the substrate, a method in which the treatment agent is entrained with an inert gas and the substrate is brought into contact with the entrained gas, and a method in which the treatment agent is directly mixed with the substrate by a mixer or a mill. Among the above examples, the method of applying the treatment agent is preferable from the viewpoint of convenience.

Examples of the method for applying the treatment agent include brush coating, spray coating, wire bar, blade, roll coating, and dipping methods.

The conditions for treating a substrate with the treatment agent containing the organosilicon compound (1) by the applying, contact, or mixing are not particularly limited as long as they are conditions under which the organosilicon compound (1) reacts with a hydroxyl group on the substrate surface.

The treatment temperature is preferably in the range of 0 to 100° C. more preferably 10 to 50° C., and still more preferably 20 to 30° C. from the viewpoint of productivity.

The treatment time is preferably in the range of 1 minute to 50 hours, more preferably 1 minute to 30 hours, and still more preferably 1 minute to 20 hours from the viewpoint of productivity, but may be appropriately set in relation to the treatment temperature.

The substrate subjected to the silane coupling treatment or the surface treatment may be either an inorganic material or an organic material.

Examples of the inorganic material include silicon compounds such as glass plates, glass fibers, diatomaceous earth, calcium silicate, silica, silicon, talc, and mica metal oxides such as zinc oxide, aluminum oxide, tin oxide, titanium oxide, iron oxide, and magnesium oxide; metal chlorides such as zinc chloride, aluminum chloride, tin chloride, titanium chloride, iron chloride, and magnesium chloride; metal hydroxides such as aluminum hydroxide and magnesium hydroxide; and carbonates such as calcium carbonate, zinc carbonate, and magnesium carbonate.

Among the above examples, silicon compounds and metal oxides are particularly preferable from the viewpoint of reactivity with the organosilicon compound (1).

Examples of the organic material include natural polymers such as rubber, paper, and cellulose; synthetic polymers such as an acrylic resin, urethane resin, epoxy resin, and phenol resin; fats and oils; surfactants; and liquid crystals.

Among the above examples, natural polymers and synthetic polymers are particularly preferable from the viewpoint of reactivity with the organosilicon compound (1).

After the silane coupling treatment or the surface treatment of the substrate is performed using the treatment agent containing the organosilicon compound (0) of the present invention, the excess treatment agent is removed by washing, drying, and the like. The post-treatments by washing and drying may be performed alone or in combination.

The washing solvent is not particularly limited, but the same solvents as the exemplified solvents for diluting the organosilicon compound (1) can be used.

The washing method is not particularly limited, but a method of immersing the silane-treated substrate in a washing solvent, a method of spraying the silane-treated substrate with a washing solvent, or the like can be adopted.

Conditions for washing and drying are not particularly limited as long as the silane-treated substrate is not adversely affected.

The washing temperature is preferably in the range of 0 to 300° C., more preferably 0 to 200° C., and still more preferably 0 to 100° C. from the viewpoint of productivity.

The washing time is preferably in the range of 1 minute to 10 hours, more preferably 1 minute to 5 hours, and still more preferably 1 minute to 2 hours from the viewpoint of productivity, but may be appropriately set in relation to the washing temperature.

The drying temperature is preferably in the range of 0 to 300° C., more preferably 0 to 200° C., and still more preferably 0 to 100° C. from the viewpoint of productivity.

The drying time is preferably in the range of 1 minute to 10 hours, more preferably 1 minute to 5 hours, and still more preferably 1 minute to 2 hours from the viewpoint of productivity, but may be appropriately set in relation to the drying temperature.

The substrate from which the excess treatment agent has been removed is exposed to a humid atmosphere to hydrolyze the remaining alkoxysilyl group.

The method for exposure to the humid atmosphere is not particularly limited, but a method of immersion in pure water such as ion-exchanged water or distilled water, a method of treatment at a predetermined humidity using a thermo-hygrostat, or the like can be adopted.

The temperature for exposure to the humid atmosphere is not particularly limited as long as the silane-treated substrate is not adversely affected, but is preferably in the range of 0 to 100° C., more preferably 10 to 80° C., and still more preferably 20 to 60° C. from the viewpoint of productivity.

Although the time for exposure to the humid atmosphere is not particularly limited as long as the silane-treated substrate is not adversely affected, the time for exposure is preferably in the range of 1 minute to 4 hours, more preferably 1 minute to 3 hours, and still more preferably 1 minute to 2 hours from the viewpoint of productivity, but may be appropriately set in relation to the temperature for exposure to the humid atmosphere.

The treatment agent containing the organosilicon compound (1) of the present invention may contain one or more of other additives selected from a pigment, antifoaming agent, lubricant, antiseptic agent, pH adjusting agent, film forming agent, antistatic agent, antibacterial agent, surfactant, dye, and the like as long as the effect of the present invention is not impaired.

EXAMPLES

Hereinafter, the present invention is described more specifically with reference to Examples and Application Examples, but the present invention is not limited to Examples mentioned below.

The purity of a fraction obtained by the distillation described below was measured by gas chromatography under the following conditions.

[Gas Chromatography Measurement Conditions]

Gas chromatograph: GC-2014 (manufactured by Shimadzu Corporation)

Packed column: Silicone SE-30 (manufactured by GL Sciences Inc.)

Detector: TCD

Detector temperature: 300° C.

Inlet temperature; 300° C.

Temperature raising program: 70° C. (0 min)→10° C./min→300° C. (10 min)

Carrier gas: helium (50 ml/min)

Injection volume: 1 µl

Example 1

Synthesis of 2,2-dimethoxy-1-(2,2,6,6-tetramethyl-4-piperidinyl)-1-aza-2-silacyclopentane A flask equipped with a stirrer, reflux condenser, dropping funnel, and thermometer was charged with 625.1 g (4.000 mol) of 4-amino-2,2,6,6-tetramethylpiperidine and heated to 150° C. After the internal temperature was stabilized, 198.7 g (1.000 mol) of chloropropyltrimethoxysilane was added dropwise over 10 hours, and the mixture was stirred at the stabilized temperature for 50 hours. After cooling the mixture to room temperature, 4-amino-2,2,6,6-tetramethylpiperidine hydrochloride generated by the reaction was removed by filtration to obtain 611.7 g of a precursor reaction liquid.

Next, a flask equipped with a stirrer, reflux condenser, fractionating head, and thermometer was charged with 611.7 g of the precursor reaction liquid and 7.6 g (0.040 mol) of a solution of sodium methoxide in methanol (28 wt % sodium methoxide), and distillation was performed while distilling off generated methanol to obtain 229.2 g of a colorless and transparent fraction having a boiling point of 178 to 179° C./5.0 kPa.

Figure 2:
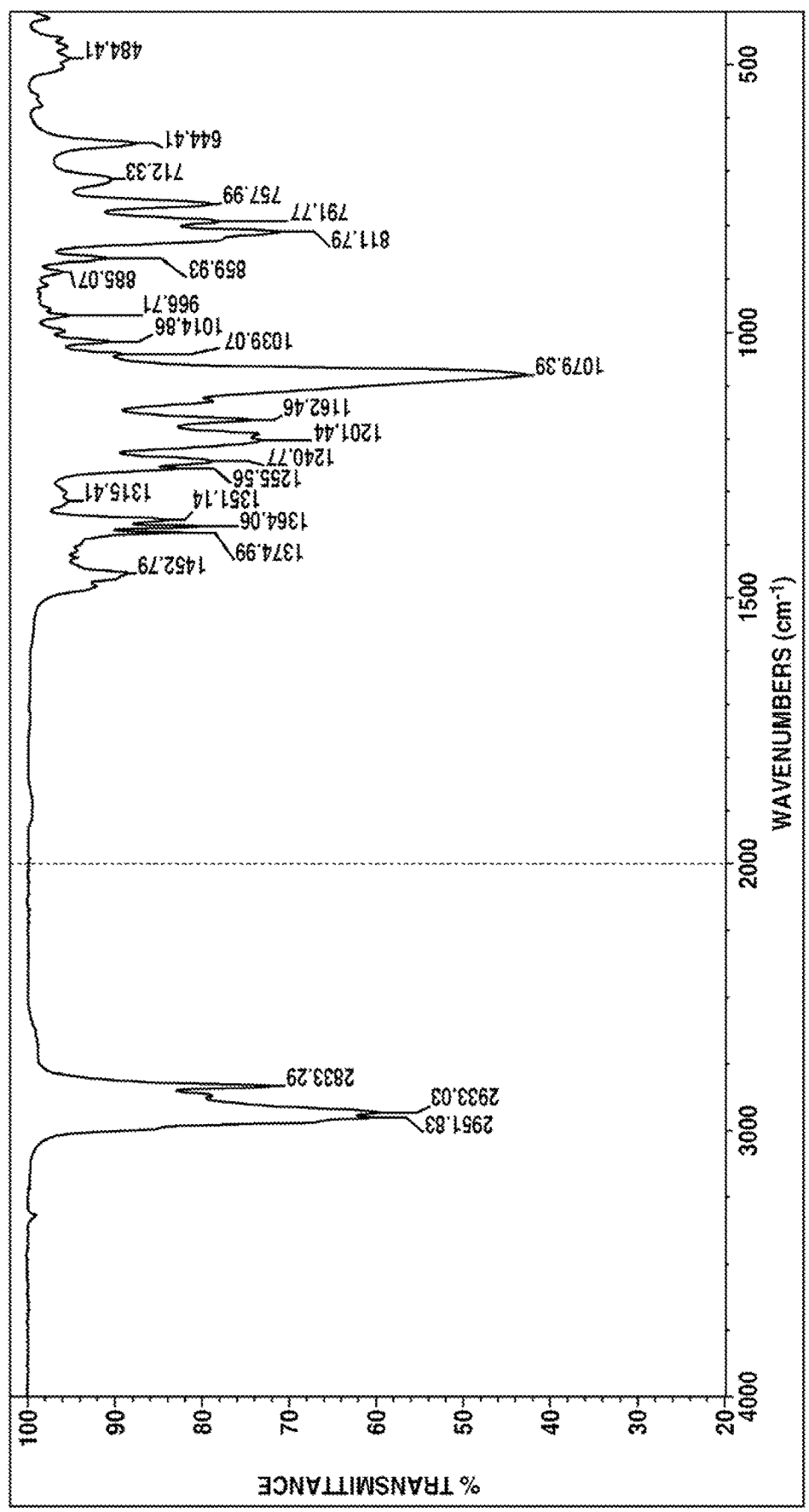
FIG. 2 is an IR spectrum of a compound obtained in Example 1.

For the obtained fraction, $^1$H-NMR spectrum (deuterated chloroform solvent) and IR spectrum were measured. The results are each shown in FIGS. 1 and 2.

From the above results, it was confirmed that the obtained fraction was 2,2-dimethoxy-1-(2,2,6,6-tetramethyl-4-piperidinyl)-1-aza-2-silacyclopentane. In addition, analysis by gas chromatography confirmed that the purity of the 2,2-dimethoxy-1-(2,2,6,6-tetramethyl-4-piperidinyl)-1-aza-2-silacyclopentane was 99.6%.

Example 2

Synthesis of 2,2-dimethoxy-1-(2,2,6,6-tetramethyl-4-piperidinyl)-1-aza-2-silacyclopentane A flask equipped with a stirrer, reflux condenser, fractionating head, and thermometer was charged with 159.3 g (0.500 mol) of N-[3-(trimethoxysilyl)propyl]-2,2,6,6-tetramethyl-4-aminopiperidine and 3.8 g (0.020 mol) of a solution of sodium methoxide in methanol (28 wt % sodium methoxide) at room temperature, and distillation was performed while distilling off generated methanol to obtain 104.9 g of a colorless and transparent fraction having a boiling point of 178 to 179° C./5.0 kPa.

The obtained fraction was analyzed by gas chromatography, and it was confirmed that the purity of 2,2-dimethoxy-1-(2,2,6,6-tetramethyl-4-piperidinyl)-1-aza-2-silacyclopentane was 99.6%.

Example 3

Production of a Mixture of 2,2-dimethoxy-1-(2,2,6,6-tetramethyl-4-piperidinyl)-1-aza-2-silacyclopentane and N-[3-(trimethoxysilyl)propyl]-2,2,6,6-tetramethyl-4-aminopiperidine A flask equipped with a stirrer, reflux condenser, fractionating head, and thermometer was charged with 159.3 g (0.500 mol) of N-[3-(trimethoxysilyl)propyl]-2,2,6,6-tetramethyl-4-aminopiperidine and 0.9 g (0.005 mol) of a solution of sodium methoxide in methanol (28 wt % sodium methoxide) at room temperature, and distillation was performed while distilling off generated methanol to obtain 129.4 g of a colorless and transparent fraction having a boiling point of 183 to 184° C./5.0 kPa.

The obtained fraction was analyzed by gas chromatography, and it was confirmed that the ratio of area % of 2,2-dimethoxy-1-(2,2,6,6-tetramethyl-4-piperidinyl)-1-aza-2-silacyclopentane to N-[3-(trimethoxysilyl)propyl]-2,2,6,6-tetramethyl-4-aminopiperidine was 72:28.

Application Example 1

Treatment of Substrate with 2,2-dimethoxy-1-(2,2,6,6-tetramethyl-4-piperidinyl)-1-aza-2-silacyclopentane The 2,2-dimethoxy-1-(2,2,6,6-tetramethyl-4-piperidinyl)-1-aza-2-silacyclopentane obtained in Example 1 was added to 100 mL of toluene so as to be 1 wt %. In this solution, a glass plate (manufactured by Matsunami Glass Ind., Ltd.; slide glass, white edge grinding frost No. 1, size 76 mm*26 mm, thickness 0.8 to 1.0 mm, frost width 15 mm*26 mm) previously cleaned with UV ozone was immersed at 25° C. for 24 hours for treatment.

The glass plate was pulled up from the solution, newly immersed in 100 mL of toluene, and cleaned with ultrasonic in an ultrasonic cleaner (manufactured by Honda Electronics Co., Ltd.; W-221) at 25° C. for 1 hour, and then dried at 50° C. for 1 hour. Thereafter, the glass plate was exposed to an atmosphere of a relative humidity of 90% in a thermohygrostat (manufactured by Yamato Scientific Co., Ltd.; IW243) at 25° C. for 1 hour.

[Performance Evaluation]

For the glass plate treated in Application Example 1, measurement was performed for the contact angle of pure water (1 μL) and the sliding angle of pure water (20 μL), and the contact angle of tetradecane (5 μL) to arbitrary 10 places on the treated surface under conditions of 25° C. and 50% RH using a contact angle meter (DMs-401, analysis software FAMAS) manufactured by Kyowa Interface Science Co., Ltd. The contact angle of pure water (1 μL) was 51.5° on average, and the standard deviation was 1.9°. The sliding angle of pure water (20 μL) was 44.0° on average, and the standard deviation was 1.7°. The contact angle of tetradecane (5 μL) was 7.0° on average, and the standard deviation was 1.1°.

From the above results, it was found that the cyclic silazane structure of the organosilicon compound (1) of the present invention easily reacts with a hydroxyl group on the substrate surface to form a covalent bond. It was also found that the treated surface exhibits hydrophilic and lipophilic wettability due to the effect of the hindered amino group.

Furthermore, even after this glass plate was left to stand at room temperature for 3 months or more, peeling or cracking did not occur on the substrate surface, and the appearance remained colorless and transparent, and it was found that the glass plate is excellent in weather resistance and transparency.

Japanese Patent Application No. 2020-119087 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. An organosilicon compound having a cyclic silazane structure of the following general formula (1):

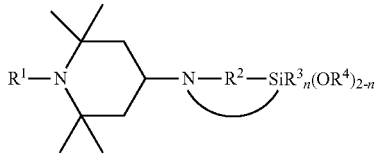

(1)

wherein $R^1$ represents a hydrogen atom, an oxy radical, a hydroxyl group, a substituted or unsubstituted alkoxy group having 1 to 10 carbon atoms, or a substituted or unsubstituted monovalent hydrocarbon group having 1 to 10 carbon atoms, $R^2$ represents a substituted or unsubstituted alkylene group having 3 to 6 carbon atoms, $R^3$ and $R^4$ each independently represent a substituted or unsubstituted monovalent hydrocarbon group having 1 to 10 carbon atoms, and n represents an integer of 0 to 2.

2. A composition comprising:
the organosilicon compound having the cyclic silazane structure according to claim 1; and
an organosilicon compound having an amino group of the following general formula (2):

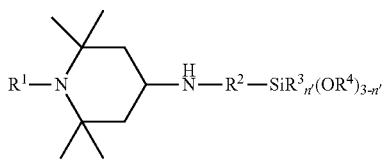

(2)

wherein $R^1$ represents a hydrogen atom, an oxy radical, a hydroxyl group, a substituted or unsubstituted alkoxy group having 1 to 10 carbon atoms, or a substituted or unsubstituted monovalent hydrocarbon group having 1 to 10 carbon atoms, $R^2$ represents a substituted or unsubstituted alkylene group having 3 to 6 carbon atoms, $R^3$ and $R^4$ each independently represent a substituted or unsubstituted monovalent hydrocarbon group having 1 to 10 carbon atoms, and n' represents an integer of 0 to 2,
the composition having a content of the organosilicon compound having the amino group of general formula (2) is 30 wt % or less.

3. A method for producing the organosilicon compound having the cyclic silazane structure according to claim 1, the method comprising distillation of an organosilicon compound having an amino group of general formula (2) in presence of a catalyst while generated alcohol is distilled off, general formula (2) being as follows:

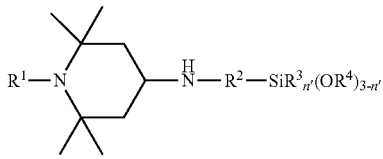

(2)

wherein $R^1$ represents a hydrogen atom, an oxy radical, a hydroxyl group, a substituted or unsubstituted alkoxy group having 1 to 10 carbon atoms, or a substituted or unsubstituted monovalent hydrocarbon group having 1 to 10 carbon atoms, $R^2$ represents a substituted or unsubstituted alkylene group having 3 to 6 carbon atoms, $R^3$ and $R^4$ each independently represent a substituted or unsubstituted monovalent hydrocarbon group having 1 to 10 carbon atoms, and n' represents an integer of 0 to 2.

4. The method for producing the organosilicon compound having the cyclic silazane structure according to claim 3, wherein the distillation is performed at a temperature of 100 to 300° C. and a pressure of 0.01 to 10.0 kPa.

5. The method for producing the organosilicon compound having the cyclic silazane structure according to claim 3, wherein the catalyst is a basic compound or an acidic compound.

6. The method for producing the organosilicon compound having the cyclic silazane structure according to claim 5, wherein the basic compound is an alkali metal alkoxide compound.

7. The method for producing the organosilicon compound having the cyclic silazane structure according to claim 5, wherein the acidic compound is a sulfonic acid compound or a carboxylic acid compound.

* * * * *